UNITED STATES PATENT OFFICE.

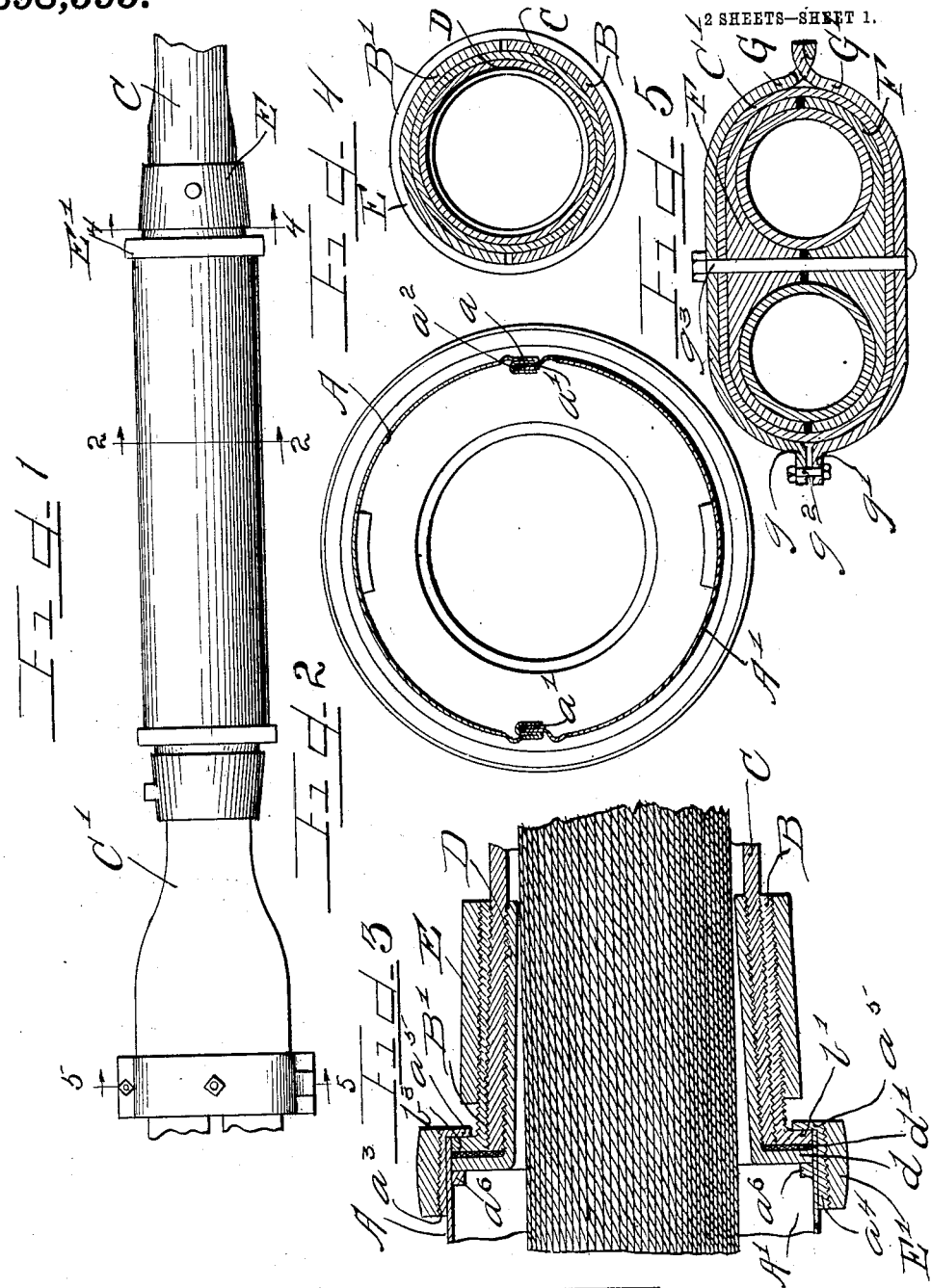

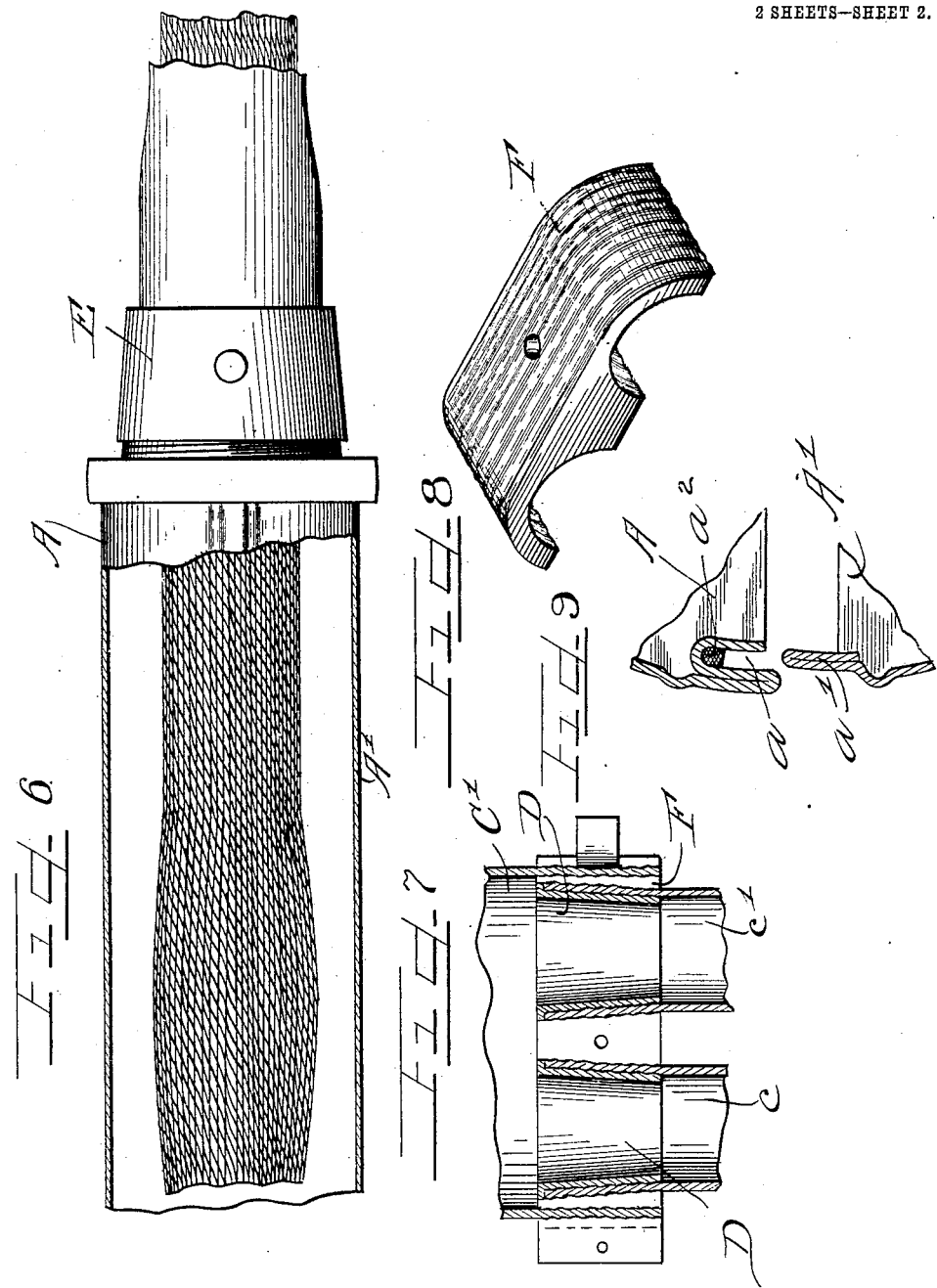

EDWARD J. NOBLETT, OF CHICAGO, ILLINOIS.

SPLICE-COUPLING FOR CABLES.

No. 898,595.  Specification of Letters Patent.  Patented Sept. 15, 1908.

Application filed March 29, 1907. Serial No. 365,414.

*To all whom it may concern:*

Be it known that I, EDWARD J. NOBLETT, a citizen of the United States, and a resident of the city of Chicago, in the county of Cook and State of Illinois, have invented certain new and useful Improvements in Splice-Couplings for Cables; and I do hereby declare that the following is a full, clear, and exact description of the same, reference being had to the drawings, and to the letters of reference marked thereon, which form a part of this specification.

This invention relates more particularly to a coupling adapted to inclose and protect the splice in electrical cables.

Heretofore where many electrical conductors are joined in a cable as in conduits and certain other purposes they are usually inclosed in a lead pipe to protect the same from moisture and from any interference that might cause short circuiting. For this purpose usually a lead casing is secured about the spliced joint and is soldered or wiped to afford a tight joint with the pipe on each side of the splice. The construction of the wiped lead joint or a soldered joint where other metals are used than lead is expensive and the couplings thus prepared are frequently defective to the extent that they permit water to pass into the pipe through the coupling thus short circuiting and putting out of service and ruining a part of the cable, frequently occasioning much loss. The construction of such couplings is not only expensive, but it requires a considerable expenditure of time to install, and should it ever be necessary to open the joint for purposes of inspection or otherwise, much time is required and usually the construction of an entirely new coupling and joints.

The object of this invention is to provide a cable coupling of the class described adapted to be quickly and easily secured upon the cable to cover the splice, and also to provide a sectional coupling in which the cable splice is absolutely protected from moisture or interference.

It is a further object of the invention to afford a coupling of the class described constructed in sections, and provided at its ends with means for gripping the ends of the lead or other conduit inclosing of the cable to afford tight joints.

It is a further object of the invention to afford a coupling of the class described of a construction which admits of opening the same by the use of a suitable tool whenever desired without danger of injuring the same or the cable and enabling the same coupling to be replaced after the inspection and in fact used many times.

The invention consists in the matters hereinafter described and more fully pointed out and defined in the appended claims.

In the drawings: Figure 1 is a fragmentary side elevation of a coupling embodying my invention, showing the same connected with branch cables at one end thereof. Fig. 2 is an enlarged transverse section of the coupling taken on line 2—2 of Fig. 1. Fig. 3 is an enlarged fragmentary longitudinal section taken thereof. Fig. 4 is a section on line 4—4 of Fig. 1. Fig. 5 is a section on line 5—5 of Fig. 1. Fig. 6 is an enlarged fragmentary side elevation partly in section. Fig. 7 is an enlarged vertical section taken through the branch coupling. Fig. 8 is a perspective view of one of the double filler blocks. Fig. 9 is a section taken through the casing and showing the parts separated as in opening the coupling casing.

As shown in the drawings: A and A' indicate semi-cylindric longitudinal sections of the tubular casing constructed of sheet metal and of a length approximately that of said coupling, and rolled or seamed at the edges as shown in Fig. 2 to afford in each edge of the upper section A, longitudinal recess $a$ for the entire length, and in the upwardly turned edges of the lower section A' a thin rolled edge $a'$ adapted to fit closely in the upper section $a$ in which is secured a strip of packing material $a^2$, such as rubber or any desired material adapted to render the seam thus formed impervious to water. Said lower section A', at its ends is united by soldering, riveting or other suitable means with a semi-circular tapering half sleeve B, which is threaded within and without and is provided with a peripheral flange $b'$ on its outer side at its larger end to which said casing section is secured, and which together with a corresponding half sleeve section B' fits about the flared or expanded end of the lead pipe conduit C which incloses the cable, and which extends therein into the casing. Said upper sleeve section B', is also provided with a flange $b^3$ corresponding with the flange $b'$ before described and which fits into the upper section A, of the coupling as shown in Fig. 3.

A slightly tapered and externally threaded sleeve D, is threaded into the conduit end C, as shown in Fig. 3 and is provided with a peripheral flange $d$, which extends outwardly to near the walls of the casing, and fits within a peripheral rib $a^6$ thereon, and a gasket $d'$ of any suitable material is engaged between the flanges $b'$—$b^3$ on the outer sleeve and the flange $d$ of the inner and between which the end of the lead conduit or other pipe is engaged. Threaded on the outer sleeve B—B′ is a complemental nut E, which being tapered internally as before described acts as a wedge in drawing the outer sleeve sections B and B′ firmly into engagement on the conduit, thus firmly gripping the same between said sleeves with the threads bedded therein to insure a tight joint.

Each of the ends of each section A and A′ is provided with an external segment $a^3$—$a^4$, together forming a ring rigidly secured thereon and provided with a flange $a^5$, which extends downwardly, and outwardly around the flange $b'$—$b^3$ and threaded on said ring to firmly jam said casing sections together is a nut E′.

The ends of the coupling are constructed alike and should it be desired to branch the cable a lead or other suitable soft metallic sleeve C′ is used, one end of which connects in the coupling as before described and the other of which is of a size and width sufficient to receive the desired number of branches and is pressed or formed to oval shape as shown in Figs. 1, 5 and 7. Said enlarged end is slightly flared or expanded, and filler blocks F, corrugated or roughened on the outer side are provided each with a semi-circular, inwardly flaring seat for each of the branch pipes to be connected therein. As shown in the drawings said branches are two in number, and the ends of the branch conduits $c$—$c'$ are spread or expanded at the inner end to fit said blocks, a tapering sleeve D, such as before described, is threaded therein to force the metal of the conduit $c$—$c'$ into the corrugations in the seats in filler blocks. Assembled as described and as shown more fully in Figs. 5 and 7, said assembled end is forced into the flaring end of the branch coupling C′ after the cables are spliced and as shown and a strong metallic clamp, comprising mutually hinged sections G, and G′ is drawn about the structure thus formed and on the side opposite the hinge is provided with outwardly directed lips or flanges $g$—$g'$, through which extends one or more bolts $g^2$, whereby said clamp can be drawn very tightly in place jamming the softer metal into the corrugations on the outer side of the filler blocks as shown in Fig. 7. To aid in this a bolt $g^3$, may be secured in apertures extending through the filler block the pipe section, the branch coupling C′ and the clamp, as shown in Figs. 1 and 5, thus enabling great pressure to be applied. Of course in so connecting the pipes in the coupling a suitable packing material may be applied on the conduit ends and on the various sleeves, filler blocks and edges of the casing before bringing the parts together, thereby insuring an impervious joint. Of course any suitable packing material may be employed for this purpose.

The operation is as follows: Should it be desired to open a coupling it is only necessary to retract the nut E′ whereupon the casing section A may be released and lifted from the section A′, thus exposing the splice.
Should it be necessary to remove the coupling entirely the nut E is retracted from each end of the coupling, the half sleeve B′ is lifted off and the sleeve D unscrewed from the end of the conduit. After the changes or repairs of the cable are effected, the pipe ends and the sleeves are again dropped into place in the lower section A′, the half sleeve section B′ is restored to place, the upper casing section A, is restored to position and the nuts E and E′ are again set up to rigidly engage all parts in operative relation.

It is obvious that a coupling constructed as described possesses great strength as compared with the usual expensive soldered constructions and also it is evident that it can be secured in place or removed without injury and again replaced in a moiety of the time required for any one of these operations where soldering is required. Furthermore from the construction described it is clear that an impervious joint is assured.

Obviously though I have shown but one construction of my invention it is capable of many modifications and for other useful purposes than those herein described. I therefore do not purpose limiting this application for patent otherwise than necessitated by the prior art as many details of construction and application may be varied without departing from the principle of my invention.

I claim as my invention:

1. A coupling for conduits and the like embracing a split casing having interfitting edges, means adapted to engage the edges of said casing together, means adapted to engage within the end of the conduit and expand the same and means connected at one end with the casing adapted to engage outside the end of the conduit and clamp said conduit between the same and expanding means.

2. A coupling embracing a split tubular casing, means adapted hermetically to seal the edges of said casing together and tapered mechanical means expanding and hermetically connecting the ends of conduits in the casing and corrugated or threaded to embed into the conduits.

3. A coupling embracing a split casing, means adapted to hermetically engage the edges of said casing together, mechanical means fitting within and outside a conduit, means for forcing the outer means to grip the conduit and afford an impervious joint and means for rigidly securing said mechanical means to the casing.

4. A coupling embracing a longitudinally split tubular casing of sheet metal, mechanical means adapted to seal the edges of said casing together and interfitting clamping members part of which are in sections capable of removal without removal of the other parts and hermetically connecting each end of the casing with the end of a conduit which communicates in the casing.

5. A coupling embracing a longitudinally split tubular casing having male and female edges adapted to interfit, packing means in the female edge, means for jamming said casing sections firmly into engagement and coacting clamping means rigidly connected to the casing at one end and adapted to rigidly engage the end of a conduit therebetween, one of said clamping members being sectional.

6. A coupling embracing a longitudinally split tubular sheet metal casing having male and female edges adapted to interfit, sectional clamping members on each end thereof, means engaged on said members for jamming the casing sections together and coacting means part of which are sectional, engaged to the casing adapted to engage the end of a conduit therebetween to provide an impervious joint.

7. A coupling comprising a sectional casing having respectively male and female edges adapted to interfit, clamping means embracing an inner expanding member to engage within the object coupled, a sectional clamping member engaging outside the coupled object and a member for forcing the sections of said sectional member to clamp the object coupled in place.

8. A coupling comprising a longitudinally split tubular casing, having interfitting edges, clamping members, one adapted to fit within the ends of the conduit and one outside the same, means for forcing the clamping members together to afford an impervious joint and clamping means adapted to jam the parts of the casing into hermetical engagement and to secure the clamping members to said casing.

9. A device of the class described embracing a longitudinally split tubular casing having male and female edges adapted to interfit for their entire length, packing therein, means rigidly engaging said parts together, gripping means connecting conduit ends hermetically in the ends of said casing, embracing a flanged sectional tapered sleeve, part of which is rigidly secured to one of the casing sections and the other part fitting in the other casing section, a threaded sleeve fitted in the end of the conduit and a tapered nut threaded on the outer sleeve.

10. A device of the class described embracing a longitudinally split tubular casing having male and female edges adapted to interfit for their entire length, the female edges containing packing, means rigidly engaging said casing sections together, means hermetically connecting conduit ends in the ends of said casing embracing a tapered flanged sectional sleeve, externally and internally threaded a part of which is rigidly secured to one of the casing sections, an externally threaded tapered sleeve engaged in the end of the conduit and a nut engaged on the sectional sleeve and jamming the conduit end between the sleeves.

11. In a device of the class described the combination with a sectional tubular casing, one section having a longitudinal groove and the other having an edge adapted to fit in said groove, a sectional sleeve threaded on both sides adapted to fit in the end of the casing and one section rigidly secured to one section of the casing, a tubular threaded sleeve adapted to grip the end of a conduit therebetween and means for forcing the sleeves together to embed the threads into the conduit.

12. In a device of the class described the combination with a casing embracing semitubular sections, one provided with grooves or recesses in its edges and the other having its edges adapted to fit therein, externally threaded tapering segments on the ends of the casing, a nut threaded thereon to tighten the same, and sleeves, one of which is sectional having concentric portions between which the end of a conduit is gripped.

13. In a device of the class described a casing, embracing sections having interfitting edges, packing at the edges, segments on each end of the casing, means forcing the same together to tighten the casing, an internal rib on each section adjacent the ends, concentric sleeves having flanges adapted to fit the inner periphery of the sections and one abutting against the ribs, packing between the flanges, said sleeves adapted to engage the end of a conduit therebetween and means for forcing the sleeves together.

14. In a device of the class specified a casing embracing sections having interfitting edges, segments on the ends of the casings, means for forcing the segments together, thereby tightening the edges of the casing, a plurality of tapered sleeves having flanges on corresponding ends to engage within the casing and threaded to engage the end of a conduit therebetween and a taper nut for tightening the sleeves.

15. In a device of the class described a sectional casing, means for tightening the casing, a sleeve having sections, one for each section of the casing, a sleeve fitting therein affording a space therebetween for receiving the end of a conduit or pipe, said sleeves threaded or corrugated on the adjacent faces and means for forcing the sectional sleeve to grip the conduit or pipe in position.

16. In a device of the class described the combination with a sectional casing, means for tightening the same, tapering sleeves adapted to grip a conduit therebetween having flanges at corresponding ends to fit within the casing, one of said sleeves being sectional and one section rigidly secured to the casing and a tapered nut for adjusting the sectional sleeve to firmly engage the conduit between the sleeves.

17. In a device of the class described the combination with a sectional casing of a section nut at each end for tightening the same, and having a flange to engage over the end of the casing, a rib in the casing, sleeves, having a space therebetween for the conduit and having flanges engaged between said rib and the flange on the nut, one of said sleeves being sectional and threaded and means forcing the sectional sleeve inwardly to grip the conduit between the same and other sleeve.

18. In a device of the class described the combination with a sectional casing, means tightening the same, sleeves having flanges engaging closely within the casing and the sleeve threaded or corrugated on adjacent faces between which a conduit is engaged, one of the sleeves being sectional and part rigidly secured to the casing, and means for forcing the sectional sleeve toward the other to force the threads into the conduit affording an impervious joint.

19. In a device of the class described a sectional casing having interfitting edges, means for jamming the edges together to afford an impervious joint, a plurality of members extending outwardly from the casing adapted to engage the end of a conduit therebetween and form an impervious joint, flanges on the ends of said members in the casing, packing therebetween and means secured to the casing for rigidly engaging the flanges therebetween and firmly securing the members to the casing.

20. In a device of the class described means forming a hermetical joint with conduits embracing corrugated or threaded members, one adapted to fit in the conduit end and the other around the conduit end, and one of the members being sectional and means for forcing one of the section members upon the other to form a tight joint.

21. In a device of the class specified connecting means for conduits and the like embracing taper sleeves adapted to engage in the ends of the conduits, a sectional member adapted to engage outside of the conduits around the sleeves and clamping means for forcing the sectional members to jam the conduits between the same and sleeves.

22. In a device of the class described means for forming an impervious joint with conduits embracing tapered sleeves adapted to fit in the ends of the conduits, a sectional member adapted to fit around the ends of the conduits and clamping means for tightening the sections to firmly secure the conduit ends between the same and sleeves to afford impervious joints.

In testimony whereof I have hereunto subscribed my name in the presence of two subscribing witnesses.

EDWARD J. NOBLETT.

Witnesses:
J. W. ANGELL,
K. E. HANNAH.